Patented Jan. 6, 1925.

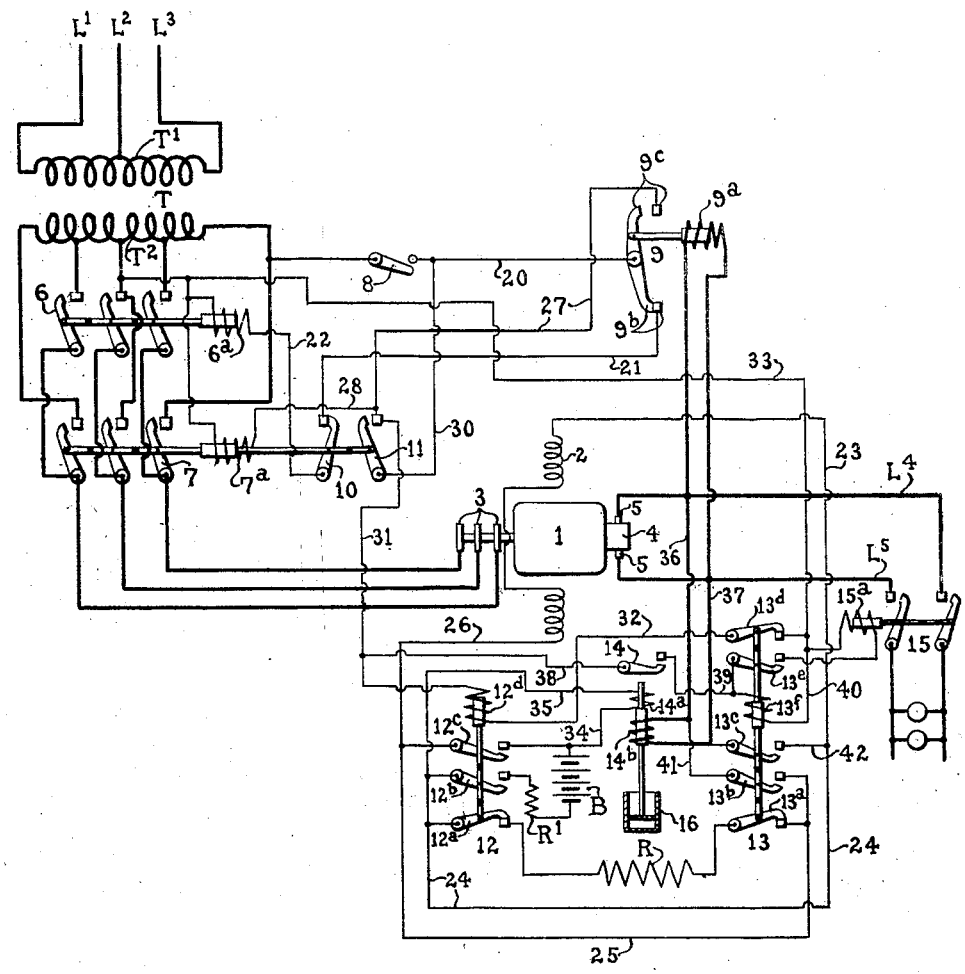

1,521,654

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ROTARY CONVERTERS.

Application filed January 31, 1921. Serial No. 441,214.

*To all whom it may concern:*

Be it known that I, EDWIN W. SEEGER, a citizen of the United States, residing at Milwaukee, in the county of Milwaukee and State of Wisconsin, have invented new and useful Improvements in Controllers for Rotary Converters, of which the following is a full, clear, concise, and exact description, reference being had to the accompanying drawing, forming a part of this specification.

This invention relates to rotary converters and more particularly to controllers for starting converters from the alternating current side.

An object of the invention is to provide a controller of the aforesaid character adapted to automatically interrupt starting connections for the alternating current side of the converter and establish running connections therefor under given current conditions in the direct current side of the converter.

Another object is to provide a controller of the aforesaid character having field control means providing for temporary excitation of the field winding of the converter from a direct current source of constant polarity upon establishment of the above-mentioned running connections to insure against polarity reversals of the converter.

Various other objects and advantages will hereinafter appear.

The accompanying drawing diagrammatically illustrates an embodiment of the invention and the same will now be described it being understood that the invention may be embodied in other forms without departing from the scope of the appended claims.

The rotary converter illustrated is of a three phase type having a rotor 1 and field winding 2. The rotor has an A. C. side provided with slip rings 3 to be supplied with current from a transformer T connected in a three phase alternating supply circuit illustrated by lines L', L² and L³ and a D. C side provided with a commutator 4 and brushes 5 for supplying a direct current circuit illustrated by lines L⁴ and L⁵.

The transformer T has a primary winding T' and a secondary winding T² and the controller includes electromagnetic starting and running switches 6 and 7 respectively for selectively connecting slip rings 3 to low and high voltage taps on said secondary winding. Said switches are controlled by a master switch 8 through the medium of a relay 9. Relay 9 has an operating winding 9ª connected across the brushes 5 on the D. C. side of the converter and the same has normally closed contacts 9ᵇ for controlling the energizing circuit of switch 6 and normally open contacts 9ᶜ for controlling the energizing circuit of switch 7. The continuity of the energizing circuit of switch 6 is also controlled by a normally closed auxiliary switch 10 associated with running switch 7 and said running switch also has a normally open auxiliary switch 11 associated therewith for establishing a maintaining circuit therefor and for controlling the energizing circuits of field control means for the converter.

The field control means includes electromagnetic switches 12 and 13, and a relay 14. Switch 12 has a normally closed switch arm 12ª for connecting the upper terminal of field windings 2 to the left hand terminal of a resistance R and normally open switch arms 12ᵇ and 12ᶜ for connecting said field winding across the terminals of a battery B through a resistance R'. Switch 13 has a normally closed switch arm 13ª for connecting the lower terminal of field winding 2 to the right hand terminal of resistance R and normally open switch arms 13ᵇ and 13ᶜ for connecting said field across the brushes 5 of the converter. Switch 13 is also provided with a normally closed auxiliary switch 13ᵈ for controlling the energizing circuit of switch 12 and a normally open auxiliary switch 13ᵉ for establishing an energizing circuit for an electromagnetic switch 15 for connecting lines L⁴ and L⁵ to a load circuit. The energizing circuit of switch 13 is controlled by relay 14 which is normally open and is retarded in closing by a dash-pot 16. Relay 14 has a winding 14ª to be supplied with current from battery B upon response of switch 12 and a winding 14ᵇ connected across brushes 5 of the converter.

The operation and circuit connections of the aforedescribed controller will now be more fully set forth. Closure of master switch 8 establishes an energizing circuit for starting switch 6 extending from the right hand tap on transformer secondary T² through said master switch by conductor 20 to and through contacts 9ᵇ of relay 9 by conductor 21 through auxiliary switch 10 by conductor 22 through winding 6ª of said starting switch to the middle tap on the transformer secondary T². Switch 6 thereupon responds to connect the slip rings 3 of the converter to low voltage taps on the transformer secondary T², through circuits which are apparent from the drawing and require no description. When such connections are established, the field winding 2 is connected in a closed loop through resistance R, said loop extending from the upper terminal of the field winding by conductors 23 and 24 through switch arm 12ª through resistance R to switch arm 13ª and by conductors 25 and 26 to the lower terminal of the field winding. The aforedescribed circuit connections provide for starting of the converter as an induction motor and as is well known during starting an alternating current is induced in the D. C. side of the converter. The frequency of this current decreases as the speed of the converter approaches synchronism and relay 9 is calibrated to respond only when synchronism is substantially attained. In responding relay 9 interrupts the energizing circuit of switch 6 and establishes an energizing circuit for switch 7 extending from the right hand tap on the transformer secondary T² to relay 9 as already traced, through contacts 9ᶜ of said relay by conductors 27 and 28 through winding 7ª to the middle tap on said secondary. Closure of switch 7 connects the slip rings 3 to the high voltage taps of the transformer secondary T² through circuit connections which are apparent from the drawing, and require no description. Upon closure of switch 7, auxiliary switch 10 opens, to insure continued interruption of the energizing circuit of winding 6ª and auxiliary switch 11 closes to establish a maintaining circuit for winding 7ª extending from conductor 20 by conductor 30 to and through auxiliary switch 11 by conductor 28 through winding 7ª to the middle tap on the transformer secondary T². Closure of auxiliary switch 11 also establishes an energizing circuit for switch 12 extending to and through said auxiliary switch as already traced by conductor 31 through winding 12ᵈ by conductor 32 through auxiliary switch 13ᵈ and by conductor 33 to the middle tap on the transformer T². Switch 12 thereupon responds to disconnect the upper terminal of field winding 2 from resistance R and to connect said field windings across the terminals of battery B. The upper terminal of field winding 2 is then connected by conductors 23 and 24 through switch arm 12ᵇ and resistance R' to the lower terminal of battery B while the lower terminal of said winding is connected by conductor 26 through switch arm 12ᶜ to the upper terminal of battery B. If the polarity of the converter is reversed during starting, as is very likely to happen, connection of the field winding 2 across the battery B will correct such reversal. Upon response of switch 12 winding 14ª of relay 14 is energized by a circuit extending from the upper terminal of battery B by conductor 34 through said winding by conductor 35 through switch arm 12ᵇ and resistance R' to the lower terminal of battery B. Winding 14ᵇ is connected across the brushes 5, by conductors 36 and 37 and when the current in the D. C. side of the converter is of zero frequency and in the proper direction the same acts cumulatively with winding 14ª to effect response of relay 14 against the action of dash-pot 16. Response of relay 14 establishes an energizing circuit for switch 13 from the right hand tap of transformer secondary T² to conductor 31 as already traced by conductor 38 to and through relay 14 by conductor 39 through winding 13ᶠ and conductors 40 and 33 to the middle tap on the transformer secondary T². In responding switch 13 disconnects the right hand terminal of resistance R from the lower terminal of field winding 2 and establishes a circuit extending from upper brush 5 by conductors 36 and 41 to and through switch arm 13ᵇ by conductor 25 through field winding 2 by conductors 23 and 42 to and through switch arm 13ᶜ by conductor 37 to the lower brush 5. Immediately following closure of switch arms 13ᵇ and 13ᶜ the auxiliary switch 13ᵈ opens to de-energize switch 12 for disconnection of battery B from the field circuit and auxiliary switch 13ᵉ closes to establish an energizing circuit for line switch 15. The energizing circuit for line switch 15 extends from the right hand tap of transformer secondary T² through relay 14 as already traced by conductor 39 to and through auxiliary switch 13ᵉ and winding 15ª by conductor 33 to the middle tap of the transformer secondary T².

What I claim as new and desire to secure by Letters Patent is:

1. The combination with a rotary converter of an alternating current supply circuit therefor, electro-responsive starting and running switches for selectively establishing starting and running connections for said converter from said circuit, a relay normally adapted to establish an energizing circuit for said starting switch and responsive upon a given reduction in frequency in the direct current side of said converter to interrupt the energizing circuit of said starting switch and establish an energizing circuit for said running switch, and means controlled by said running switch to temporarily include a separate source of direct current of constant polarity in the field of said converter to thereby insure establishment of said running connections under conditions of correct polarity.

2. The combination with a rotary converter of electro-responsive switches for selectively establishing starting and running connections for the alternating current side of said converter, means rendering the operation of said switches dependent upon current conditions in the direct current side of said converter, a direct current source of constant polarity for exciting the field of said converter and means providing for temporary excitation of the field of said converter from said source upon establishment of said running connections.

3. The combination with a rotary converter of an alternating current supply circuit therefor electro-responsive starting and running switches for selectively establishing starting and running connections for said converter from said circuit, a relay normally adapted to establish an energizing circuit for said starting switch and responsive upon a given reduction in frequency in the direct current side of said motor to interrupt the energizing circuit of said starting switch and establish an energizing circuit for said running switch, and field control means for said converter controlled by said running switch.

4. The combination with a rotary converter of an alternating current supply circuit therefor electro-responsive starting and running switches for establishing starting and running connections for said converter from said circuit a relay responsive to given frequency conditions in the direct current side of said converter for timing the operation of said said starting and running switches and field control means for said converter including a relay for connecting the field of said converter to a source of direct current of constant polarity, said relay being controlled by said running switch.

5. The combination with a rotary converter of electro-responsive switches for selectively establishing starting and running connections for the alternating current side of said converter, a battery, and means subjected to control by current conditions in the direct current side of said converter for connecting said battery in the field circuit of said converter for a temporary period upon establishment of the aforesaid running connections.

6. In combination, a rotary converter, a source of direct current of constant polarity, and field control means for said converter including a plurality of electro-responsive switches one being responsive to connect the field of said converter to said source and the other being responsive to connect said field to the direct current side of said converter and control means for said switches to insure their operation in a definite relation.

7. In combination, a rotary converter, a source of direct current of constant polarity, and field control means for said converter including a plurality of electro-responsive switches one being responsive to connect the field of said converter to said source and the other being responsive to connect said field to the direct current side of said converter, and means responsive to current conditions in the direct current side of said converter to govern the operation of both of said switches.

8. In combination, a rotary converter, a source of direct current of constant polarity, and field control means for said converter including a plurality of electro-responsive switches, one being responsive to connect the field of said converter to said source and the other being responsive to connect said field to the direct current side of said converter and a relay for governing the operation of both of said switches, said relay having a plurality of operating windings one to be connected to said source of current upon response of said former switch and the other being connected to the direct current side of said converter.

In witness whereof, I have hereunto subscribed my name.

EDWIN W. SEEGER.